(12) United States Patent
Oberdorfer (10) Patent No.: US 6,757,709 B1
(45) Date of Patent: Jun. 29, 2004

(54) METHOD AND APPARATUS FOR PROVIDING A CLIENT SYSTEM WITH INFORMATION VIA A NETWORK

(75) Inventor: Roland Franz Oberdorfer, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/543,182

(22) Filed: Apr. 5, 2000

(51) Int. Cl.[7] .............................................. G06F 15/16
(52) U.S. Cl. ...................... 709/203; 709/218; 709/224; 707/100
(58) Field of Search ................................ 709/200–226; 707/10, 100; 711/113

(56) References Cited

U.S. PATENT DOCUMENTS

| | | | |
|---|---|---|---|
| 5,710,887 A | 1/1998 | Chelliah et al. | ............ 395/226 |
| 5,870,546 A | 2/1999 | Kirsch | ................... 395/200.33 |
| 6,189,030 B1 * | 2/2001 | Kirsch et al. | ............... 709/224 |
| 6,275,939 B1 * | 8/2001 | Garrison | ..................... 713/200 |
| 6,633,878 B1 * | 10/2003 | Underwood | ................ 707/100 |

OTHER PUBLICATIONS

"Frames: An Introduction" undated.
"BroadVision Solutions: One–To One Business Commerce" undated.
"Understanding Networked Applications" by Messer-schmitt, First Edition, 2000, pps. 147, 216–217, 423–424, 449–453.

* cited by examiner

Primary Examiner—Hosain Alam
Assistant Examiner—Shabana Qureshi (57) ABSTRACT

A method performed by a first server system to provide a client system with information via a network, comprising the steps of: serving to the client system first page information including at least one reference to information available from an external server; receiving a request from the client system, the request being indicative of a selection of the reference at the client system; sending a request to the external server; sending a request to the external server; receiving the external server information via the network; preparing second page information using at least part of the external server information; and sending said second page information to the client system.

25 Claims, 8 Drawing Sheets

METHOD AND APPARATUS FOR PROVIDING A CLIENT SYSTEM WITH INFORMATION VIA A NETWORK

FIELD OF THE INVENTION

The present invention relates to a method and apparatus for providing a client system with information via a network, and more particularly, to the integration of external Web pages or information therefrom in an e-commerce application.

BACKGROUND OF THE INVENTION

Within the last decade, the Internet has become the most commonly used network for computer communication. The Internet comprises a vast number of computers and computer networks that are interconnected through communication links. The interconnected computers (hosts) can exchange information using a request-response protocol, the Hypertext Transfer Protocol (HTTP) which forms the basis of what is called the World Wide Web. Each resource (e.g., computer or web page) of the World Wide Web is uniquely identifiable by a Uniform Resource Locator (URL). The communication on the Internet is based on the Transmission Control Protocol and the Internet Protocol (TCP/IP). The HTTP request-response protocol defines the interaction of a Web client (Web browser) and a Web server. The request is initiated by the user activating a hyperlink. A hyperlink is, for example, in a graphical Web page a highlighted piece of text associated with a URL, and the request can be activated by clicking on the hyperlink. The URL has three parts representing the protocol (in this case HTTP), the name of the host desired, and, optionally, the name of the desired document on that host. The most common request is for an Hypertext Markup Language (HTML) or Extensible Markup Language (XML) document. The requested document may include Mobile Code, for example a Java script. However, it may also be a simple alphanumeric data file. The Web server returns a response including the requested document. Finally, the Web browser displays the document or executes the Mobile Code.

The World Wide Web is especially conducive to conducting electronic commerce. Many Web servers have been developed through which vendors can advertise and sell products. The server may provide an electronic version of a catalog that lists the items that are available. A user may browse through the catalog using the browser and select various items that are to be purchased.

U.S. Pat. No. 5,710,887 assigned to Broadvision discloses an electronic commerce application. A corresponding electronic commerce application is commercially available from BroadVision, Inc. ("BroadVision" is a registered trade mark of BroadVision, Inc.). The BroadVision application is not included in the Web server software but is constituted by interacting functional program objects, like a participant program object, a customer monitoring program object or a sales representatives program object. The application has also objects, like a pricing engine, a payment handler and an order fulfilment interface, that are to be interfaced with external objects. These objects may comprise network connections to external subsystems. For instance, the payment handler may be connected to an external payment handler via a computerized credit card network. The program objects of the BroadVision application are objects in compliance with the Common Object Request Broker Architecture (CORBA). CORBA is a standard for distributed object management and provides a standard definition for the interfaces between the distributed objects. It can also be used for interfacing functional program objects which are not distributed on different hosts but reside on the same host. A more detailed explanation of CORBA can be found in the book by David G. Messerschmitt "Understanding Networked Applications", 1st edition, 2000, pages 451–453. The BroadVision application is combined with a Web server coupled to the Internet. For this purpose, the Web server includes a Common Gate Way Interchange (CGI) (see Messerschmitt, page 147). Broadvision uses a session concept; id est a session is started when a client initiates a transaction and is maintained until the transaction is completed. Although such an architecture based on distributed object management has many advantages it does not provide a possibility for linking to external Web sites during a session while maintaining the session and the "look and feel" of the application.

Different methods of obtaining information from different Web servers are known. In the most common method, a Web page from a certain server may include hyperlinks to other servers. Upon selection of the hyperlink a request is sent to the corresponding other server, and upon receipt of its response, the first Web page from the first server is replaced by the second Web page from the second server.

A recent extension to HTML has introduced "frames" which allow to split the browser view into multiple windows, with each window displaying an independent Web page. Each frame can be given an individual URL so that information from different servers can be simultaneously displayed. The frame technique is implemented in recent versions of the Netscape browser (Netscape is a registered trademark of Netscape Communications Corporation). A description of the frames technique can be found at http://home.netscape.com/assist/net_sides/frames.html.

U.S. Pat. No. 5,870,546 discloses a method for redirection of server external hyperlink reference. Normally, if a client selects a hyperlink in a Web page received from a first server, control over the client is lost. However, for Web advertisement an accounting of how often a reference is selected is required since the frequency of display of an advertisement generally defines the compensation paid to the advertisement publisher. In order to allow such accounting, a Web page served by the server to the client embeds a URL reference to a Web page to be served by the external server system. Selection of this embedded URL through the client browser results in a HTTP transaction with the server rather than the external server. The information stored in the embedded URL first served with the Web page to the client is thus provided back to the server upon selection of the URL even though the apparent target of URL is the external server. After the accounting has been performed in the server, a redirection response is provided by the server to the client providing the redirection URL corresponding to the external server. Finally, the server sends a request to the URL at the external server. Although this method improves the accounting possibilities, control may be lost as soon as the redirection request directed to the external server is sent from the server to the client.

SUMMARY OF THE INVENTION

A method performed by a first server system provides a client system with information via a network. The method comprises the steps of: serving to the client system first page information including at least one reference to information available from an external server; receiving a request from the client system, the request being indicative of a selection of the reference at the client system; sending a request to the external server; receiving the external server information via the network; preparing second page information using at least part of the external server information; sending said second page information to the client system.

According to another aspect, an apparatus for providing a client system with information via a network comprises a first server system. The first server system comprises: a server component that receives requests from the client system and sends first and second page information to said client system, said first page information contains at least one reference to information available from an external server; a browser component that requests the referenced information from at least one external server, and receives said external server information over the network; and a spoofing system that controls said browser component, and prepares said second page information using at least part of said external server information.

According to still another aspect, an apparatus for providing a client system with information via a network, comprises a first server system which comprises: a client request respond unit; a client request receipt unit; a link translator; an external server request unit; and an external server receipt unit.

Other features are inherent in the disclosed method and apparatus or will become apparent to those skilled in the art from the following detailed description and its accompanying drawings.

DETAILED DESCRIPTION OF THE PREFERRED EMBODIMENTS

Figure 1:
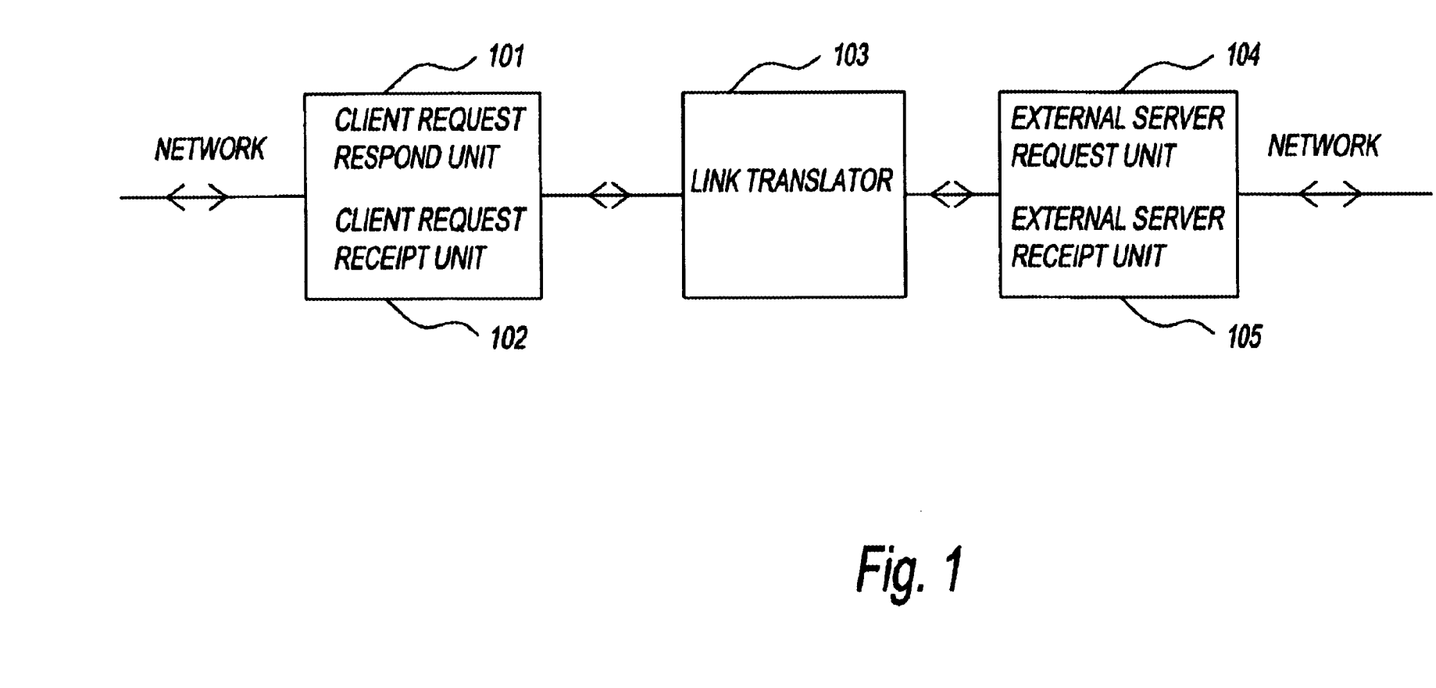
FIG. 1 is a block diagram showing functional modules of an embodiment.

The block diagram of FIG. 1 shows functional modules of an embodiment. Before proceeding further with the discussion, however, a few terms will be defined.

The term "page information" refers to any information forming a document which can be displayed or otherwise reproduced at the client system. A document may contain text, images, audio clips and/or video clips, etc., and structural elements such as paragraphs and headings (see Messerschmitt, page 216–217, 423–424). The document may be provided in a document standard called Markup Language, like HTML or XML, and may comprise Movable Code, for example a Java Script. The page information may include hyperlinks. Preferably, the page information does not include any hyperlinks to external servers. Rather, references to an external server that can be activated by the user (client) are embedded in hyperlinks to the first server system so that their activation results in a request being sent to the first server system rather than directly to the external server.

A connotation of the word "spoofing" is a technique used to gain unauthorized access to a host, whereby the intruder sends a message to a host with an IP address indicating that the message is coming from a trusted host. To achieve this, a hacker must first find an IP address of a trusted host and then modify the packet headers of the message so that it appears that the packets are coming from that host. In context of the disclosed embodiments, however, the term "spoofing" is used to designate the disclosed method.

The network is preferably the Internet and/or a corresponding intranet, id est an intranet using Internet protocols, in particular TCP/IP. For simplicity, in the following the term Internet is also used for such networks comprising or consisting of an intranet. The interconnected hosts can exchange information using a request/response protocol like HTTP (World Wide Web).

Preferably, the external server (or "external site") resides on a computer which is physically distinct from the computer on which the server of the first server system (the first server or first site) resides, and both computers are coupled via the Internet. However, it is also possible that the external site and the first site reside on the same computer (what is also called a "multi-site server"). The communication between the external site and the first site is then carried out within the computer via a local network using Internet protocols. Such a local network is also considered as a part of "the network". Therefore, also in such a situation, the first server (the first site) sends its request to and receives the requested information from the external server (the external site) "via the network".

The second page information is prepared by extracting at least part of the information from the external server and combining it with page information already available at the first server system, by combining page information received from the external server with page elements from the first server system (for example, banners, footing, navigation bars etc.) or by modifying the second page information which is received from the external server, or a combination of some or all of these possibilities. The modification comprises removing at least one, but preferably all links to the or other external servers that can be activated by the user, and translating at least one or preferably all these links to a link to the first server system which includes a reference corresponding to the original link.

The main function of the first server system is to act as a Web server for a commercial transaction (electronic commerce) application. The first and second page information sent to the client is related to this application. Electronic commerce comprises the sale of goods or services (in the form of interenterprise (B2B), consumer-enterprise or inter-consumer e-commerce), auctions, financial transactions like network banking and stock trading. A preferred commercial transaction application is the "BroadVision One-To-One Business Commerce" application, commercially available from BroadVision, Inc.

The commercial transaction application uses a session concept. Whereas HTTP is stateless, in an application based on the session concept the server side processes maintain state by keeping a session for each visitor. This is achieved by embedding a session identifier into all HTML that is output to the client's browser. Whenever the visitor clicks on a link or submit bottom the session information is sent back to the commercial transaction application. The spoofing process of the disclosed method is fitted into this session concept such that the session state is maintained during the spoofing.

The commercial transaction application comprises a multiplicity of functional objects. Such a functional object is a combined software and data object devoted to a certain function, like session management, order management, pricing, shipping, tax handling, payment etc. Communication between objects takes place via software interfaces under the control of a Distributed Object Management. The Distributed Object Management may be based, for example, on the CORBA or the DCOM standards (see Messerschmitt, pages 449–453). The term "Distributed" means the objects are logically separated and, optionally also physically distributed to different computers. Most of the functional objects are internal (id est only logically separated), whereas other reside on external computers and are coupled to the internal objects by a telecommunication connection or a network. Normally a commercial transaction action (for example, the payment of previously selected goods) is initiated by a call to the corresponding functional object. The disclosed method is at least partly carried out by a spoofing object embedded in the commercial transaction application.

FIG. 1 shows a block diagram of functional modules of an embodiment of an apparatus for providing a client system with information via a network. The functional modules are a client request respond unit 101, a client request receipt unit 102, a link translator 103, an external server request unit 104 and an external server receipt unit 105. Although the disclosed apparatus is preferably implemented by software executing on a first server system 16 (FIG. 3), it could likewise be implemented in whole or in part by firmware or is hardware without departing from the scope or spirit of the invention. The disclosed software is stored on a computer readable medium such as a hard drive or other memory device at the first server system.

Figure 2:
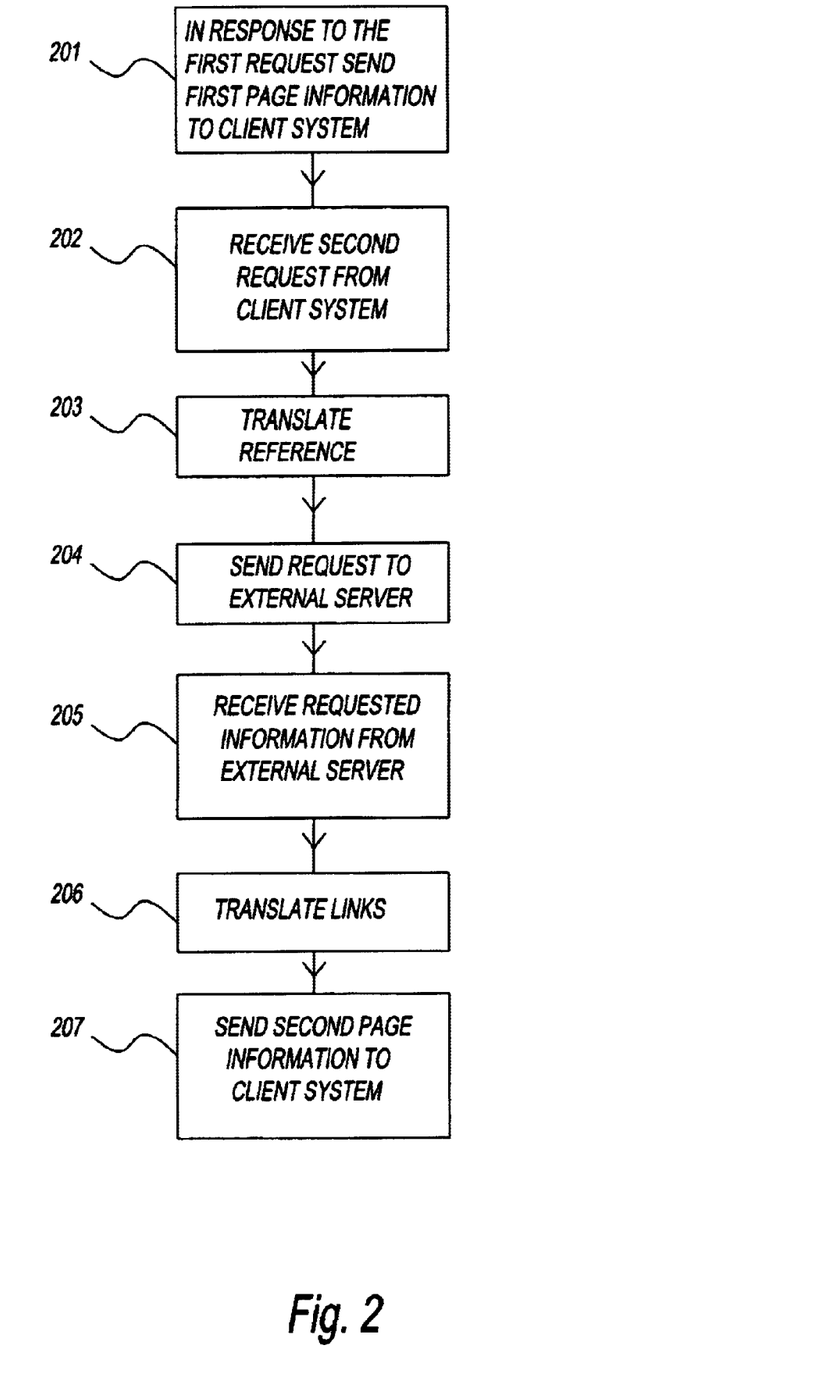
FIG. 2 is a flowchart referring to the block diagram of FIG. 1.

The function of the functional modules is further explained by the flowchart of FIG. 2. At block 201, upon a client's first request, the client request respond unit 101 sends first page information to the client system. At block 202, the client request receipt unit 102 receives a second request from the client. At block 203, the link translator 103 translates a reference to an external server included in the second request to a link to the external server. At block 204, the external server request unit 104 sends a request to the external server. At block 205, the external server receipt unit 105 receives the requested information from the external server. At block 206, the link translator 103 translates links to the external server and other external servers which are included in this information to links to the first server system including a reference corresponding to the original link to the external server. In the preferred embodiment all links to external servers are translated. In other embodiments only are part of these links are translated, and the remaining links are removed. At block 207, the client request respond unit 101 sends second s page information prepared in this way to the client system.

Figure 3:
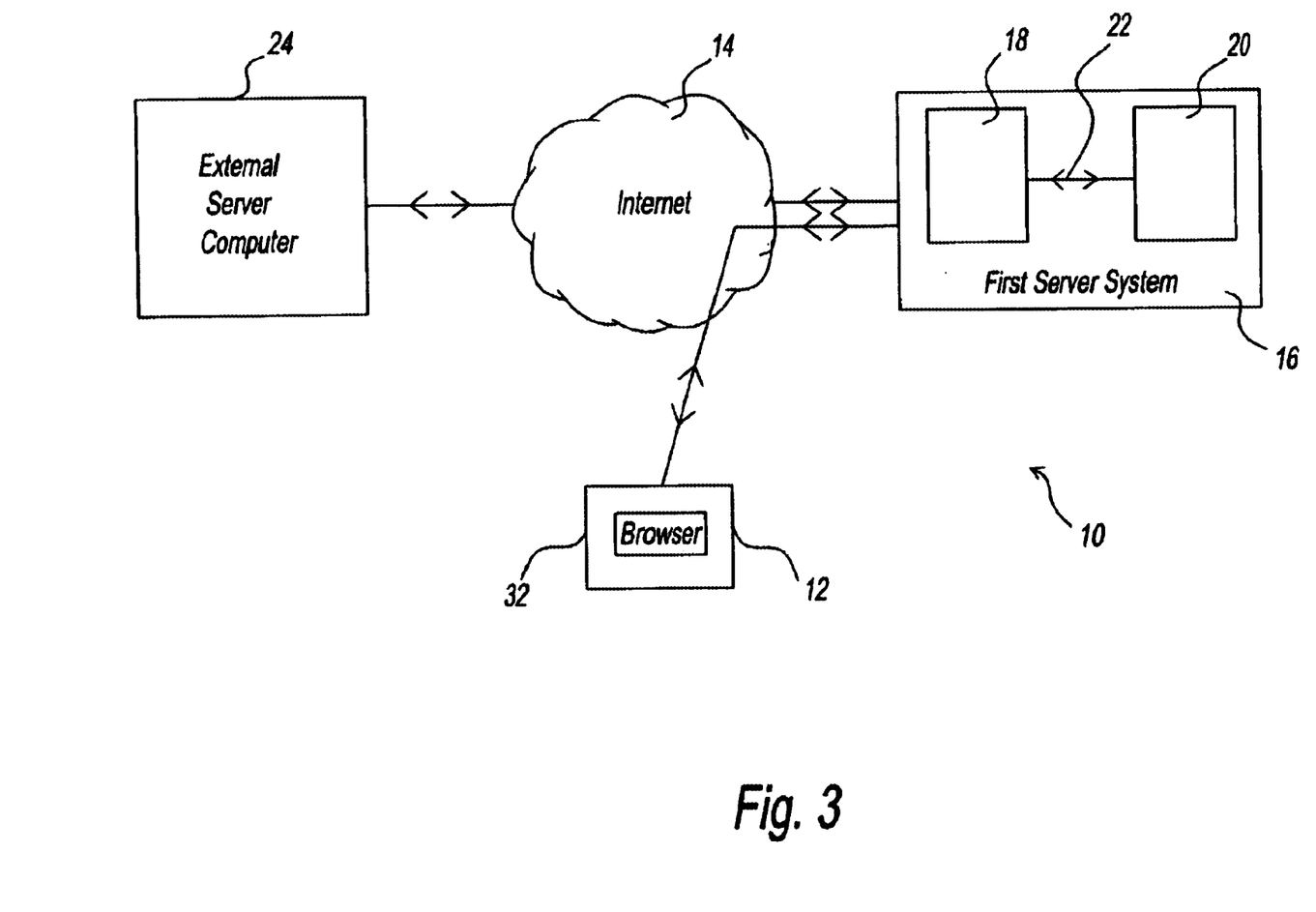
FIG. 3 is a schematic representation of client, first server and external server computer systems networked through the Internet illustrating the spoofing process.

A typical environment 10 utilizing the Internet for network services in accordance with the teaching of the invention is shown in FIG. 3. A client computer system 12 is coupled directly or, for example, through an Internet service provider to the Internet 14. A Web browser 32 executes on the client computer system 12. By logical reference via a URL, the client system 12 may access a Web site on a first server system 16. The first server system 16 comprises a first server computer 18 coupled to the Internet 14 and an application computer 20 coupled to the first server computer 18 via an interface 22. Out of many other servers coupled to the Internet, only one is shown and is denoted as "external server computer 24". As mentioned above, the external server computer 24 and the first server computer 18 can also be coupled via an intranet using Internet protocols. HTTP interactions are conducted between the client browser 32 and a HTTP server application executing on the first server computer 18 as well as between a browser application executing on the first server computer 18 and a HTTP server application executing on the external server computer 24. As mentioned above, the external server may also be an application which resides on the server computer 18 and is coupled via a local network to the server application which resides on the same computer.

An e-commerce application, like Broadvision, is executing on application computer 20. The e-commerce application uses a session concept, id est, whenever a client (customer) starts an e-commerce transaction a session is opened and a session ID is assigned to this session, which identifies all requests and communication from the client until the e-commerce transaction is terminated. The first server system 16 sends page information in the form of Web pages to the client computer system 12 for initiating, conducting and terminating e-commerce transactions. The Web pages sent during a session have no hyperlinks to other Web sites than the commercial transaction Web site on the first server computer 18 in order to avoid a loss of customers to external Web sites. However, there are instances when information is advantageously located externally to the Web site of the commercial transaction application, for example: Content that requires special software to run (such as configurators), content that is shared between multiple commerce centers; and content that is shared between electronic marketing and electronic commerce sites.

If a customer chooses a certain action by clicking at a corresponding button (e.g. payment of ordered articles) a call to the corresponding object of the electronic commerce application is carried out, for example:

Call Payobj (Session ID=xyz)

In order to obtain information from an external Web site, a normal hyperlink would read, for example:

HREF="http://external_site.com/page1"

However, by offering such a normal hyperlink the client could be lost or the session be interrupted. Therefore, instead of the above hyperlink, the Web page has a call to a spoofing object having the URL of the external site embedded as an argument, for example:

Call Spoofobj(SessionID=xyz,url="http://external_site.com/page1")

In other embodiments, the reference to the external URL may be indirect (e.g. a number between 1 and 64) and may then refer to a list of URLs stored at the first server system 16. The indirect addressing has the advantage that a reference can be changed by simply amending one entry in a cross-reference list.

Upon receipt of such a request, the first server system 16 sends a request to the external site at the external server computer 24, for example:

HREF="http://external_site.com/page"

Then, the first server system 16 receives the response from the external server computer 24 over the Internet 14.

The response may be, for instance, a markup language Web page including hyperlinks or a data file with plain text.

The information received from the external server 24 is then modified at the first server system 16. For example, if the external server information represents a Web page, all hyperlinks to other Web sites than the Web site of the commercial transaction application are translated into calls to the spoofing object including a reference to the external Web site as a parameter. For example the Web page returned from the external server 24 has the following hyperlink:

HREF="http://external_site.com/page2"

This hyperlink is translated into:

Call Spoofobj(SessionID=xyz,
url=http://external_site.com/page2)

Further, the title of the Web page may be replaced so that it appears to originate from the Web site of the commercial transaction application. When the external server information is a plain text file, data from this file are copied into a markup language Web page available at the first server system 16. Finally, the Web page is sent to the client system 12 via the Internet in response to the previous client system's request. The client system 12 receives information only via the first server system 16 rather than directly from the external server 24. The second Web page sent to the client system 12 contains no hyperlinks to other Web sites than the Web site of the commercial transaction application, which could be activated by the customer.

Figure 4:
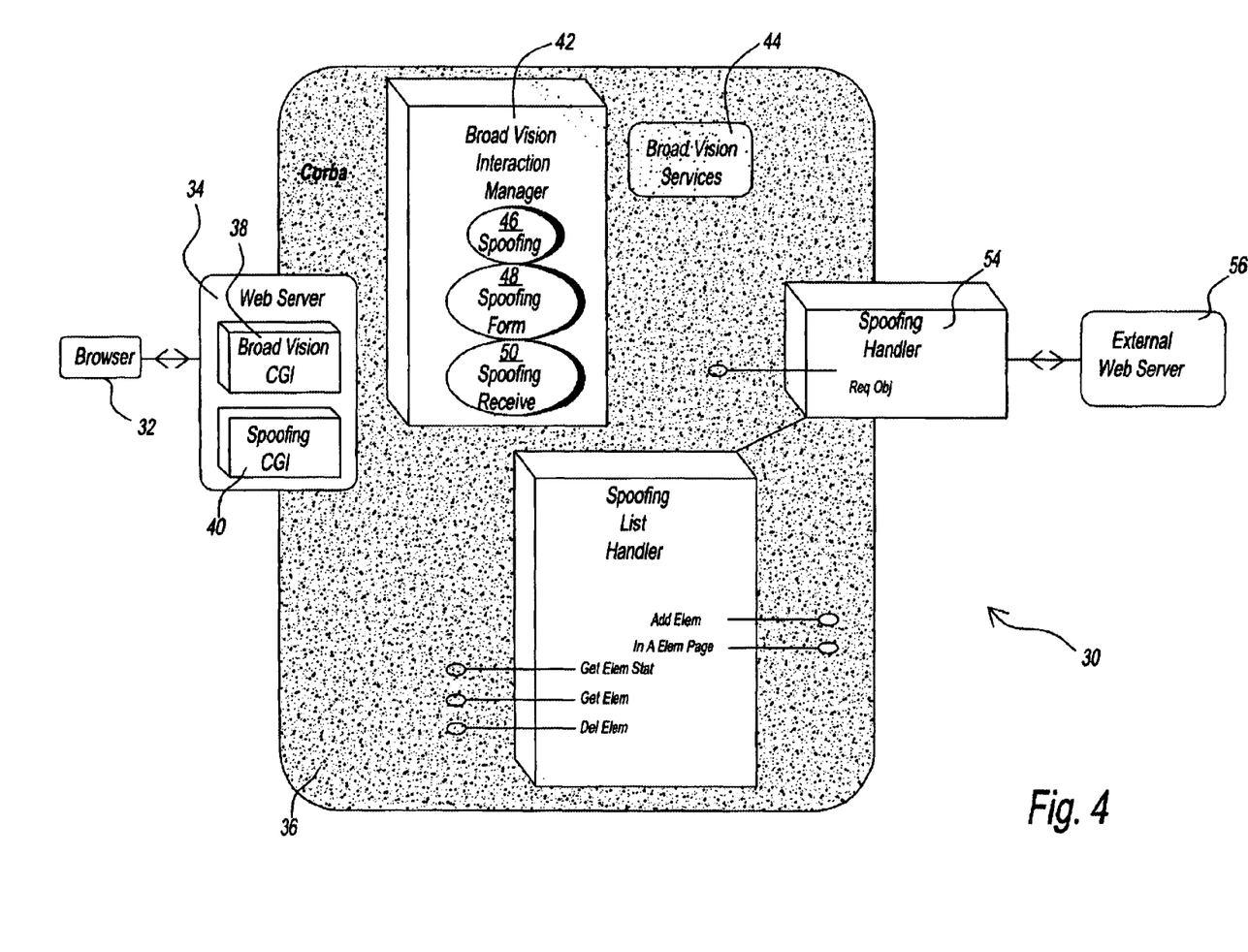
FIG. 4 schematically depicts the software architecture of an embodiment of this invention together with a commercial transaction application.

FIG. 4 shows a high level architecture diagram 30 of the software objects of the preferred embodiment of this invention. The browser 32 executing on the client system is coupled via the Internet 14 to a Web server 34 executing on the first server computer 18 of the first server system 16. The Web server 34 interacts with application logic 36 by means of two Common Gateway Interchanges (CGIs), a BroadVision CGI 38 and a Spoofing CGI 40. The application logic 36 comprises a BroadVision interaction manager 42 and BroadVision service objects 44, which are explained in more detail in conjunction with FIG. 5. Compared with the commercially available BroadVision application, the BroadVision interaction manager 42 is extended by spoofing related objects, namely a spoofing object 46, a spoofing form object 48 and a spoofing receive object 50. Further, the application logic 36 comprises a spoofing list handler 52 and a spoofing handler 54. The spoofing handler 54 communicates via the Internet with an external Web server 56 executing on the external server computer 24 of FIG. 3. The spoofing, spoofing form and spoofing receive objects 46, 48, 50, a spoofing list handler 52 and the spoofing handler 54 are objects written in C++ and managed, as the BroadVision service objects 44, by Distributed Object Management of the CORBA standard. The spoofing, spoofing form and spoofing receive objects 46, 48, 50 are loaded when the BroadVision application is started. For each session, one spoofing handler 54 is set up. Therefore, the number of spoofing handlers 54 corresponds to the number of active sessions. However, there is only one spoofing list handler 52 which tracks all requests of the several spoofing handlers 54.

Figure 5:
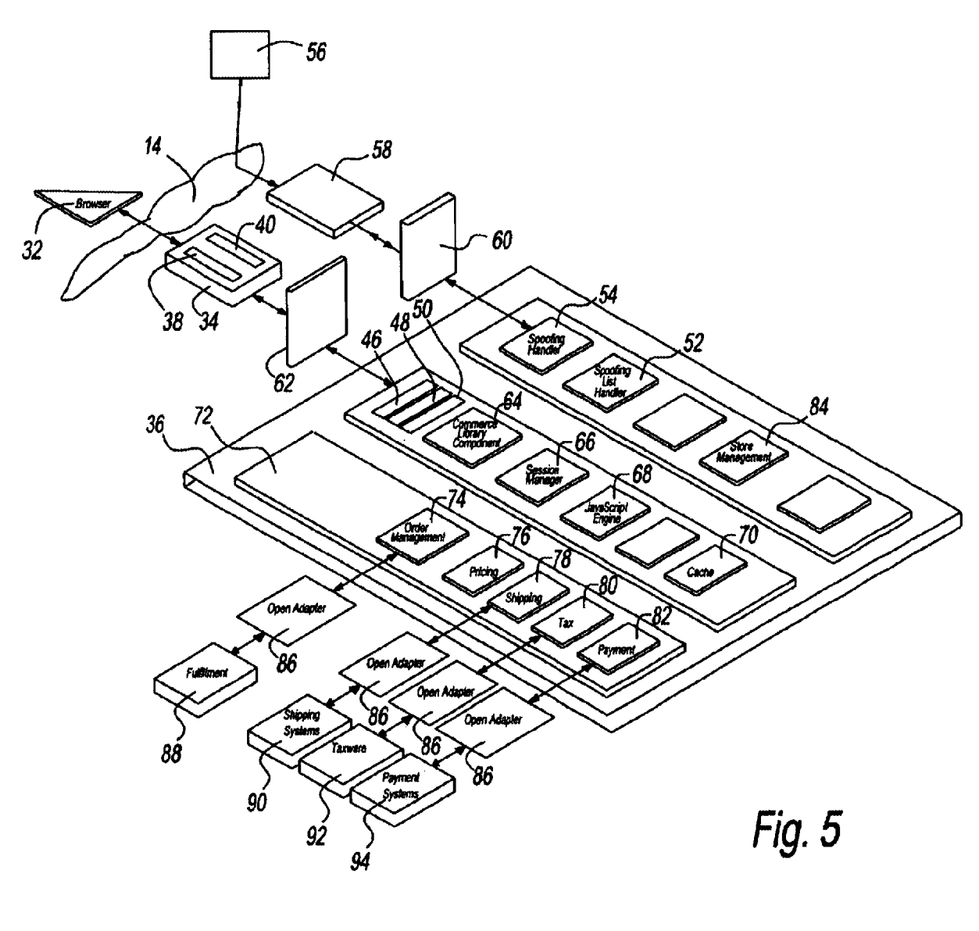
FIG. 5 schematically depicts the architecture of an embodiment of an invention similar to FIG. 4 but shows more details of the commercial transaction application.

FIG. 5 shows more details of the high level architecture 30 of the preferred embodiment of this invention. As can be seen, the spoofing handler 54 is coupled via a spoofing browser 58 to the Internet 14 in order to access the external Web server 56. Between spoofing handler 54 and spoofing browser 58 and between interaction manager 42 and Web server 34 fire walls 60 and 62, respectively, are provided. FIG. 5 also shows the BroadVision service objects (denoted with 44 in FIG. 4) of the BroadVision one-two-one software in more detail. The BroadVision interaction manager 42 comprises, apart from the spoofing, spoofing form and spoofing receive objects 46, 48, 50 a commerce library component 64, a session manager 66, a JavaScript engine 6and a cache 70. A transaction engine 72 comprises several internal transaction objects: an order management object 74, a pricing object 76, a shipping object 78, a tax object 80 and a payment object 82. A store management object 84 can, for example, collect customer usage data, monitor store sales data, monitor ordering processes etc. It is connected with a graphical user interface running at a store manager's local desktop computer (not shown). The internal transaction objects 74, 78, 80, 82 are connected via standardized interfaces 86 to external objects 88, 90, 92, 94. In particular, the order management object 74, shipping object 78, tax object 80 and payment object 82 are connected to a fulfillment object 88, shipping system 90, tax ware 92 and payment systems 94, respectively. These external objects may be well-known existing implementations, for example, the payment systems may be VISA's computerized credit card network. The communication between the internal objects 74, 78, 80, 82 and the external objects 88, 90, 92, 94 may be carried out via networks. This communication is, however, subordinated to the corresponding internal transaction object and cannot be used to directly provide the user with external information without previously activating the corresponding transaction engine object. This is only achieved by the spoofing extensions of this invention. The objects of the interaction manager 42, the transaction engine 72, the spoofing list handler 52, the spoofing handler 54 and the store management objects 84 are in compliance with the Common Object Request Broker Architecture (CORBA).

Figure 6:
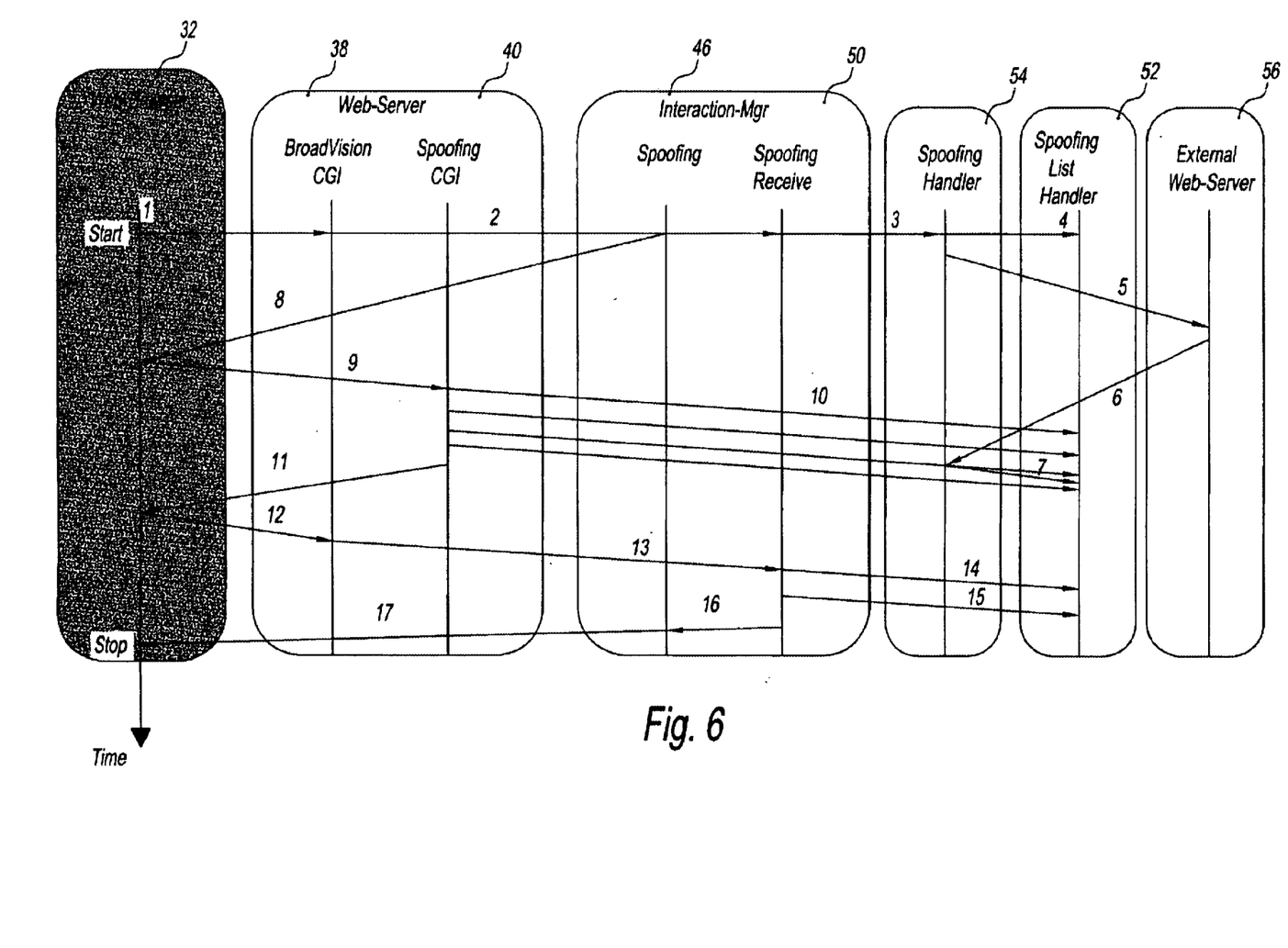
FIG. 6 shows a protocol interaction diagram of an embodiment of the invention.

The protocol interaction diagram of FIG. 6 illustrates the interactions that occur between the different entities involved in the spoofing process and, by the passage of time (from top to bottom), the order in which those interactions occur. The spoofing process starts with Step 1 and terminates with Step 17. The process is initiated by the BroadVision CGI 38 of the first Web server 34 receiving a request from the client's Web browser 32 over the Internet 14. Every request from the client, be it a standard BroadVision request or a spoofing request, is first passed to the BroadVision CGI 38. In Step 2 the request is further passed to the spoofing receive object 50. If the request is a standard BroadVision request it is, from here on, handled by the BroadVision interaction manager 42 without further spoofing action. However, if the request is a spoofing request including a reference to the external Web server 56, as is assumed in the present case, two actions are initiated simultaneously: In Step 3, a spoofing handler 54 is started. This may be the first spoofing handler or, if one or more spoofing handlers already exist, a further spoofing handler; and in Step 8, a "Relocate" of the original request to the first Web browser 32 is carried out. Step 3 initiates two simultaneous steps, Steps 4 and 5, at the spoofing handler 54: In Step 5 the spoofing handler 54 sends a HTTP request via the spoofing browser 58 to the external Web server 56 according to the reference included in the spoofing request; and In Step 4, the spoofing handler 54 signs on at the spoofing list handler 52 which then notes that this spoofing handler 54 has become active and has made the request for certain information for the external Web server 56. In the meantime, the Web browser 32 has received the relocated request as a result of Step 8. Parameters of this relocate sent to the Web browser 32 together with the relocated original request indicate that this is a spoofing request rather than a standard BroadVision request. Due to this indication, the Web browser 32 forwards the relocated request over the Internet to the spoofing CGI 40 in Step 9. In Step 10, the spoofing CGI 40 repeatedly inquires of the spoofing list handler 52 whether the information requested from the external Web server 56 is already present, and, if applicable, fetches this information from the spoofing list handler 52. When the external Web server 56 has responded to the request from spoofing handler 54 by sending the requested information to it (Step 6), the spoofing handler 54 notifies the spoofing list handler 52 of the arrival of the requested information and sends this information to the spoofing list handler 52 (Step 7). Thereupon, the next of the repeated inquiries of Step 10 is successful. Then, in Step 11 the spoofing CGI 40 initiates a further relocate of the original request to the Web browser 32. Parameters of this second relocate indicate to the Web browser 32 that the requested information can be fetched from the spoofing list handler 52. In Step 12, a corresponding request is sent over the Internet to the BroadVision CGI 38 which forwards this request to the spoofing receive object 50 in Step 13. In Step 14, the spoofing receive object 50 fetches the information received from the external Web server 56 from spoofing list handler 52. In addition, in Step 15 the spoofing receive object 50 deletes the entry corresponding to the present spoofing process from a list of pending spoofing processes maintained at the spoofing list handler 52.

In Step 16, the spoofing receive object 50 translates all hyperlinks to external Web sites from the Web page received from the external Web server 56 into links to the BroadVision application Web site including the original links as parameters and complements this Web page by banners, footing, navigation bars etc. from the BroadVision application Web site. Finally, in Step 17, the resulting Web page is sent to the Web browser 32 in response to the initial client's request.

Figure 7A:
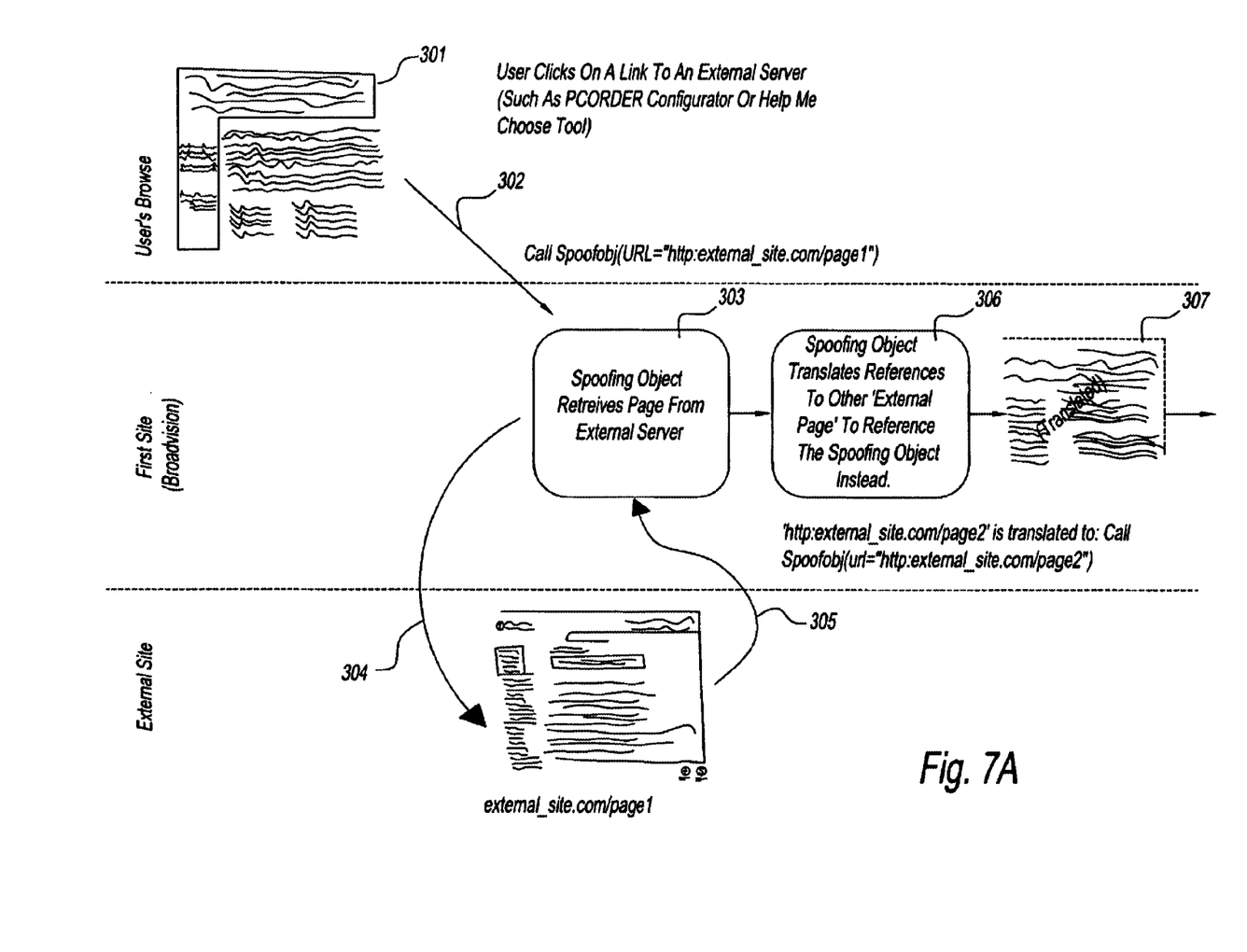
FIG. 7 illustrates an embodiment of the spoofing process.
Figure 7B:
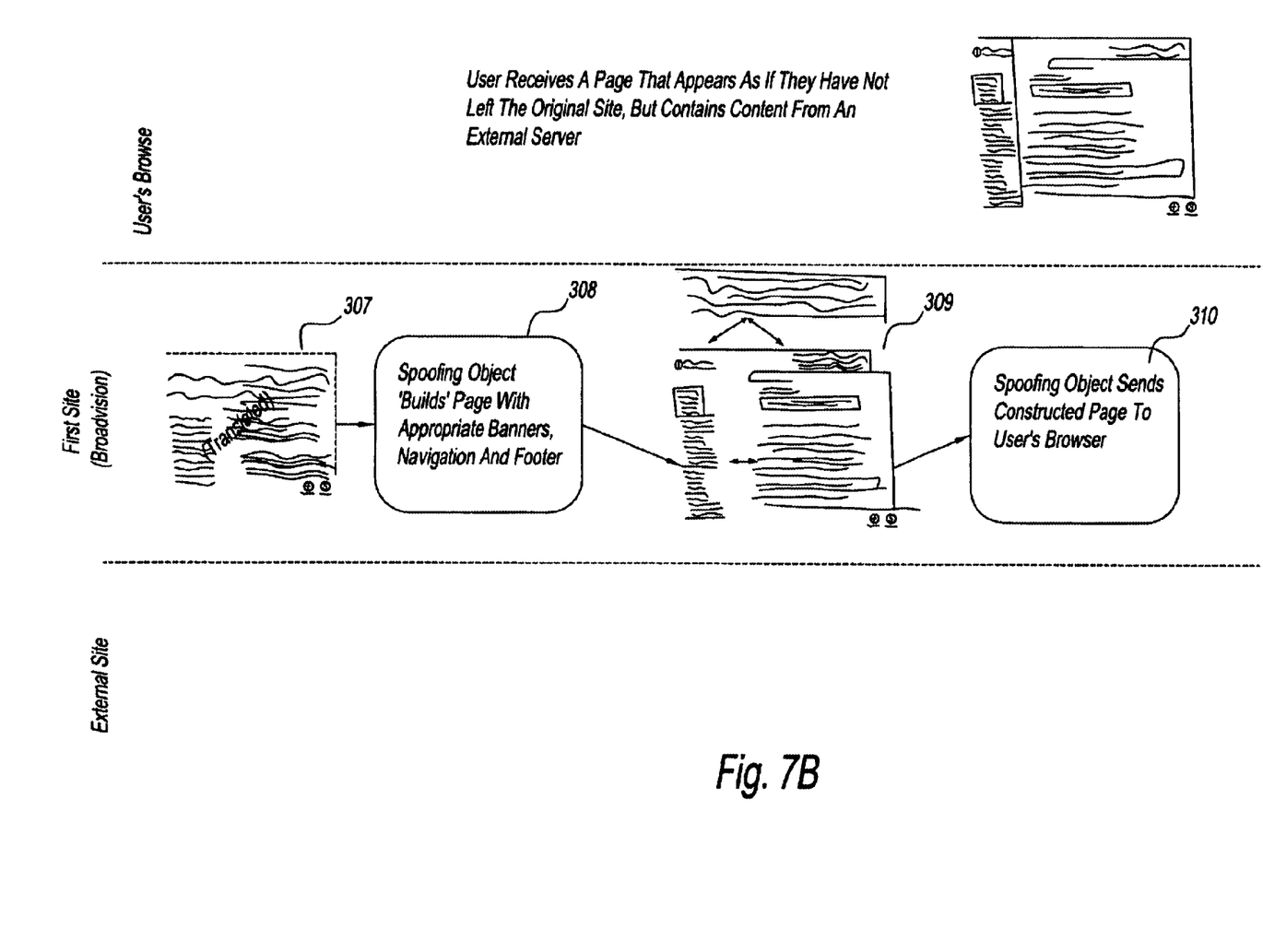

FIG. 7 illustrates several steps of an embodiment of the spoofing process. The figure has three lines: The top line refers to the client's browser, the middle line to the first site and the bottom line to the external site. As a first step, a first Web page is sent from the first site to the client's browser. The first Web page is then displayed at the client's browser, as shown at 301. The first Web page 301 does not contain any hyperlinks to external sites. Rather, all references to external sites (like a pcorder configurator or a help me choose tool, here for example: http://external_site.com/page1) are embedded as a parameter to calls to a spoofing object at the first site. In Step 302 the user clicks on such a "link" which initiates the following call to the spoofing object:

Call Spoofobj(url="http://external_site.com/page1")

In Step 303 the spoofing object retrieves the referenced page (http://external_site.com/page1) from the external server. This retrieval action includes requesting the referenced page (http://external_site.com/page1) from the external site (Step 304) and receiving this page from the external site (Step 305). In Step 306, the spoofing object at the first site translates all hyperlinks to external pages which are on this page to spoofing object calls having a reference to the external page of the original hyperlink embedded as a parameter. For example, a hyperlink to external site:

http://external_site.com/page2 is translated to:

Call Spoofobj(url="http://external_site.com/page2")

The "translated" Web page 307 (id est the Web page with the translated hyperlinks) is then completed by appropriate banners, a navigation bar and a footer (Step 308). The translated and completed Web page ("second Web page") is shown at 309. In Step 310, the spoofing object sends the second Web page to the client's browser. In Step 311, the user receives the second page which appears as if he had not left the first site, although the page includes content from an external server.

Thus, a general purpose of the disclosed method and apparatus is to provide an improved method and server system for providing a client system with information via a network. The look and feel of the commercial transaction application is preserved, the transaction session is maintained and a possible loss of customers by linking to external Web sites is avoided.

All publications and existing systems mentioned in this specification are herein incorporated by reference.

Although certain methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method performed by a first server system to provide a client system with information obtained from an external server via a network, comprising the steps of:

serving, by the first server system, to the client system first page information including at least one reference to the information available from the external server;

receiving, at the first server system, a request from the client system, the request being indicative of a selection of the reference at the client system;

sending, by the first server system, a request for the external server information to the external server on a route in the network which does not include the client system;

receiving, at the first server system, the requested external server information via the network, wherein said external server information may contain a link to the external server or a further server;

preparing, by the first server system, second page information using at least part of said external server information, wherein said preparing, in response to a detection of a link to the external server or a further server, includes at least one of: i) removing the link to the external server or the further server; and ii) translating the link to the external server or the further server to a link to the first server system; and sending said second page information from the first server system to the client system.

2. The method of claim 1, wherein said network comprises at least one of: i) the Internet, and ii) an intranet using Internet protocols.

3. The method of claim 1, wherein the step of preparing the second page information comprises using the information received from the external server by at least one of: i) extracting at least part of the information received from the external server and combining it with page information already available at the server system; ii) combining the information received from the external server with page elements from the first server system and iii) modifying the information received from the external server.

4. The method of claim 1, wherein the translated link to the first server system includes a reference to the original link to the external server or the further server.

5. The method of claim 1, wherein the first server system acts also as server for a commercial transaction application and at least one of the first and second page information is related to the commercial transaction application.

6. The method of claim 5, wherein the commercial transaction application uses a transaction session concept.

7. The method of claim 6, wherein, when said method is carried out during a transaction session, said transaction session is maintained during the carrying out of said method.

8. The method of claim 5, wherein the commercial transaction application comprises a multiplicity of functional objects, and a commercial transaction action is initiated by a call to at least one of said functional objects.

9. The method of claim 8, wherein said method is carried out at least partly by a spoofing object embedded in the commercial transaction application by a call to said spoofing object.

10. The method of claim 5, wherein the commercial transaction application is a BroadVision application.

11. The method of claim 5, wherein the steps of receiving a request from the client system, sending a request to the external server, receiving the external server information, preparing second page information and sending said second page information to the client system comprise at least one of the following steps:
   a) receiving the request from the client system in a server of the first server system,
   b) forwarding the received request to an interaction manager spoofing receive object through a Common Gateway Interchange for the commercial transaction application;
   c) if the forwarded request contains a reference to information available on the external server, initiating forwarding a corresponding request to the external server and relocating the forwarded request to the first server;
   d) handling the relocated request by a spoofing CGI comprising repeatedly checking whether the information requested from the external server has been received;
   e) if the information requested from the external server has been received, relocating the request to the first server and directing it to the commercial transaction application CGI;
   f) preparing the second page information by at least one of the following activities: i) removing at least one link from the information received from the external server; ii) translating at least one link in the information received from the external server to a link to the first server including a reference corresponding to the original link; and iii) incorporating at least part of the information received from the external server in page information from the first server system;
   g) sending said second page information to the client system via said first server.

12. An apparatus for providing a client system with information via a network, comprising:
   a first server system able to communicate with the client system and an external server via the network, said first server system comprising a server component, a browser component, and a spoofing system;
   wherein the server component is arranged to receive a first request from the client system and, and in response to the first request, send first page information to said client system, wherein said first page information contains at least one reference to information available from the external server, and to receive a second request from the client system including a reference to information available from the external server;
   wherein the browser component is arranged, in response to the receipt of the second request with the reference to the external server information at the first server system, to send at request for the referenced information to the external server on a route in the network which does not include the client system, and to receive said external server information over the network, said external server information containing a link to the external server or a further server;
   wherein the spoofing system is arranged, in response to a detection of a link to the external server or a further server, to prepare said second page information using at least part of said external server information by at least one of: i) removing the link to the external server or the further server; and ii) translating the link to the external server or the further server to a link to the first server system:
   wherein the server component is further arranged to send the second page information to the client system, as a response to the second request.

13. The apparatus of claim 12, wherein said network is one of or a combination of the following networks: i) the Internet, and ii) an intranet using Internet protocols.

14. The apparatus of claim 12, wherein the spoofing component is arranged to prepare the second page information by at least one of: i) extracting at least part of the information received from the external server and combining it with page information already available at the first server system; ii) combining the information received from the external server with page elements from the first server system and iii) modifying the information received from the external server.

15. The apparatus of claim 14, wherein the spoofing component is arranged to include, in the translated link to the first server system a reference to the original link to the external server or the further server.

16. The apparatus of claim 12, wherein the server component acts also as server for a commercial transaction application and at least one of the first and second page information is related to the commercial transaction application.

17. The apparatus of claim 16, wherein the commercial transaction application comprises a multiplicity of functional objects, and a commercial transaction action is initiated by a call to at least one of said functional objects.

18. The apparatus of claim 16, wherein said spoofing system is at least partly embedded in the commercial transaction application.

19. The apparatus of claim 12, wherein said server component comprises a commercial transaction CGI and a spoofing CGI.

20. The apparatus of claim 12, wherein said spoofing system comprises at least one of: i) an interaction manager spoofing object; ii) an interaction manager spoofing receive object; iii) a spoofing handler; and iv) a spoofing list handler.

21. An apparatus for providing a client system with information via a network, comprising a first server system able to communicate with the client system and an external server via the network, said first server system comprising:
   a client request respond unit;
   a client request receipt unit;
   a link translator;
   an external server request unit;
   an external server receipt unit;
   wherein the client request receipt unit is arranged to receive a first request for first page information from the client system;
   wherein the client request respond unit is arranged, in response to the first request, to send said first page information to said client system, said first page information containing at least one reference to information available from the external server;

wherein the client request receipt unit is further arranged to receive a second request for second page information from the client system including a reference to information available from the external server;

wherein the link translator is arranged to translate the second request to the first server system including a reference to the external server to a request for the referenced information to the external server;

wherein the external server request unit is arranged, in response to the translation of the second request, to send the request for the referenced information to the external server on a route in the network which does not include the client system;

wherein the external server receipt unit is arranged to receive the requested external server information over the network, said external server information containing a link to the external server or a further server;

wherein the link translator is further arranged to prepare second page information using at least part of said external server information by at least one of: i) removing the link to the external server or the further server, and ii) translating the link to the external server or the further server to a link to the first server system;

wherein the client request respond unit is further arranged to send the second page information to the client system, as a response to the second request.

22. The apparatus of claim 21, wherein said network is one of or a combination of the following networks: i) the Internet, and ii) an intranet using Internet protocols.

23. The apparatus of claim 21, wherein the first server system is arranged to also act as server for a commercial transaction application and at least a part of the responses sent to the client system by the client request respond unit are related to the commercial transaction application.

24. The apparatus of claim 23, wherein the commercial transaction application comprises a multiplicity of functional objects.

25. The apparatus of claim 23, wherein said link translator is at least partly embedded in the commercial transaction application.

* * * * *